US007017350B2

(12) United States Patent
De Sousa et al.

(10) Patent No.: US 7,017,350 B2
(45) Date of Patent: Mar. 28, 2006

(54) COMBUSTION CHAMBER HAVING A FLEXIBLE CONNECTION BETWEEN A CHAMBER END WALL AND A CHAMBER SIDE WALL

(75) Inventors: Mario De Sousa, Cesson la Foret (FR); Didier Hernandez, Quiers (FR); Philippe Guerville, Vaux le Penil (FR)

(73) Assignee: SNECMA Moteurs, Paris (FR)

( * ) Notice: Subject to any disclaimer, the term of this patent is extended or adjusted under 35 U.S.C. 154(b) by 103 days.

(21) Appl. No.: 10/845,113

(22) Filed: May 14, 2004

(65) Prior Publication Data

US 2005/0000228 A1 Jan. 6, 2005

(30) Foreign Application Priority Data

May 20, 2003 (FR) .................................. 03 06016

(51) Int. Cl.
*F02C 7/20* (2006.01)

(52) U.S. Cl. .......................................... 60/796; 60/800

(58) Field of Classification Search .......... 60/752–760, 60/796, 800
See application file for complete search history.

(56) References Cited

U.S. PATENT DOCUMENTS

| | | | | |
|---|---|---|---|---|
| 6,655,148 | B1 * | 12/2003 | Calvez et al. | 60/753 |
| 6,668,559 | B1 * | 12/2003 | Calvez et al. | 60/796 |
| 6,675,585 | B1 * | 1/2004 | Calvez et al. | 60/796 |
| 6,708,495 | B1 * | 3/2004 | Calvez et al. | 60/753 |
| 6,732,532 | B1 * | 5/2004 | Camy et al. | 60/796 |
| 6,775,985 | B1 * | 8/2004 | Hansel et al. | 60/772 |
| 6,823,676 | B1 * | 11/2004 | Conete et al. | 60/796 |
| 6,895,761 | B1 * | 5/2005 | Mitchell et al. | 60/796 |
| 6,904,757 | B1 * | 6/2005 | Mitchell et al. | 60/800 |

FOREIGN PATENT DOCUMENTS

| | | |
|---|---|---|
| FR | 2 825 779 | 12/2002 |
| FR | 2 825 781 | 12/2002 |
| FR | 2 825 784 | 12/2002 |

* cited by examiner

*Primary Examiner*—William H. Rodriguez
(74) *Attorney, Agent, or Firm*—Oblon, Spivak, McClelland, Maier & Neustadt, P.C.

(57) ABSTRACT

The invention relates to an annular combustion chamber for a turbomachine of axis X, in which the chamber end wall is fixed to inner and outer side walls by means of a plurality of radially-inner attachment fittings and by means of a plurality of radially-outer attachment fittings disposed upstream from said chamber end wall by bolting a zone of each of said fittings to said side walls. At least one of said pluralities of attachment fittings is integrated in a ring secured to the chamber end wall and comprises a plurality of pairs of tabs which extend upstream beyond the bolting zones, the two tabs in each pair being disposed circumferentially on either side of a bolting zone and being interconnected at their upstream end to the upstream end of a fixing plate which extends between said two tabs and which presents a bolting zone for being fixed to the adjacent side wall.

7 Claims, 4 Drawing Sheets

COMBUSTION CHAMBER HAVING A FLEXIBLE CONNECTION BETWEEN A CHAMBER END WALL AND A CHAMBER SIDE WALL

The invention relates to an annular combustion chamber for a turbomachine of axis X, the chamber comprising a radially-inner side wall, a radially-outer side wall, and a chamber end wall disposed between said inner and outer side walls in the upstream region of said chamber, said chamber end wall being fixed to said inner and outer side walls by means of a plurality of radially-inner attachment fittings and by means of a plurality of radially-outer attachment fittings disposed upstream from said chamber end wall by bolting a zone of each of said fittings to said side walls.

BACKGROUND OF THE INVENTION

At present, the chamber end wall and the inner and outer side walls are made out of materials that are similar, having coefficients of expansion that are close, and the connection between the chamber end wall and said inner and outer side walls is implemented by rigidly bolting fittings which can be short in the axial direction.

In order to increase the efficiency of turbomachines, in particular in aviation, the temperature of the gases in the hot combustion zones are being raised ever higher, and the side walls are being protected by films of cooling air.

In order to ensure that the chamber end wall, which is usually made out of a material similar to that used for making the inner and outer side walls, is not subjected to levels of deformation that are irreversible due to excessively high temperature, the chamber end wall can be made out of a material that is different from that used for the radially-inner and radially-outer side walls, said material being capable of withstanding high temperatures. Under such circumstances, the coefficient of expansion of the material constituting the chamber end wall is different from that constituting the inner and outer side walls, and the connection between the chamber end wall and said inner and outer side walls by rigid bolting, i.e. using short fittings, becomes inconceivable from the point of view of the mechanical strength of the parts involved.

The attachment fittings are subjected to increasing stresses with increasing radial expansion differences between the bolting zones and the anchor points where the fittings are anchored on the chamber end wall, and these stresses become particularly great when the distance across the fitting between the anchor point and the bolting zone is short.

In order to reduce these stresses for predetermined differences in radial expansion, it is possible to increase the distance across the fitting between the anchor point and the bolting zone by using flexible fittings that are arch-shaped and that turn radially around the nuts of the bolts. However such flexible fittings occupy a large amount of space in the enclosure situated upstream from the chamber end wall, where upstream is defined relative to the normal upstream to downstream or inlet to outlet flow direction of gas flowing through the combustion chamber.

Unfortunately, the space available in said enclosure is limited, because of the presence of injector systems.

OBJECTS AND SUMMARY OF THE INVENTION

There thus exists a need for a novel attachment fitting which provides the flexibility needed to accommodate different degrees of radial expansion between the various parts and which does not occupy excessive space in the radial direction. This is the object of the invention.

The invention thus provides a combustion chamber as specified in the introduction.

In the combustion chamber, at least one of said pluralities of attachment fittings is integrated in a ring secured to the chamber end wall and comprises a plurality of pairs of tabs which extend upstream beyond the bolting zones, the two tabs in each pair being disposed circumferentially on either side of a bolting zone and being interconnected at their upstream end to the upstream end of a fixing plate which extends between said two tabs and which presents a bolting zone for being fixed to the adjacent side wall.

This disposition of the fitting increases the distance across the fitting between the anchor points of the tabs and the bolting zone by twice the distance between the bolting zone and the upstream end of the fixing plate, without significantly increasing the radial extent of the fitting of the invention compared with a rigid traditional attachment fitting of small axial extent.

The following dispositions are preferably also adopted:

The upstream ends of the tabs in a pair of tabs, and the upstream end of the associated fixing plate include portions of extra thickness for withstanding radial bending stresses.

Each tab is separated from the associated fixing plate by a slot opening out into a hole situated in the vicinity of the portion of extra thickness. These holes enable shape stress concentrations to be reduced close to the portions of greater thickness.

To enable them to be integrated in their environment, the tabs are S-shaped between the ring and the bolting zone. These S-shapes also increase the distance across the fitting between the anchor points of the tabs and the bolting zones, thereby improving the flexibility of the tabs.

The tabs are suitable for bearing against the adjacent side wall at least in the vicinity of the S-shape in order to limit the extent to which the chamber end wall can move relative to said side wall in the event of vibratory resonance.

BRIEF DESCRIPTION OF THE DRAWINGS

Other characteristics and advantages of the invention will appear on reading the following description given by way of example and made with reference to the accompanying drawings, in which.

MORE DETAILED DESCRIPTION

Figure 1:
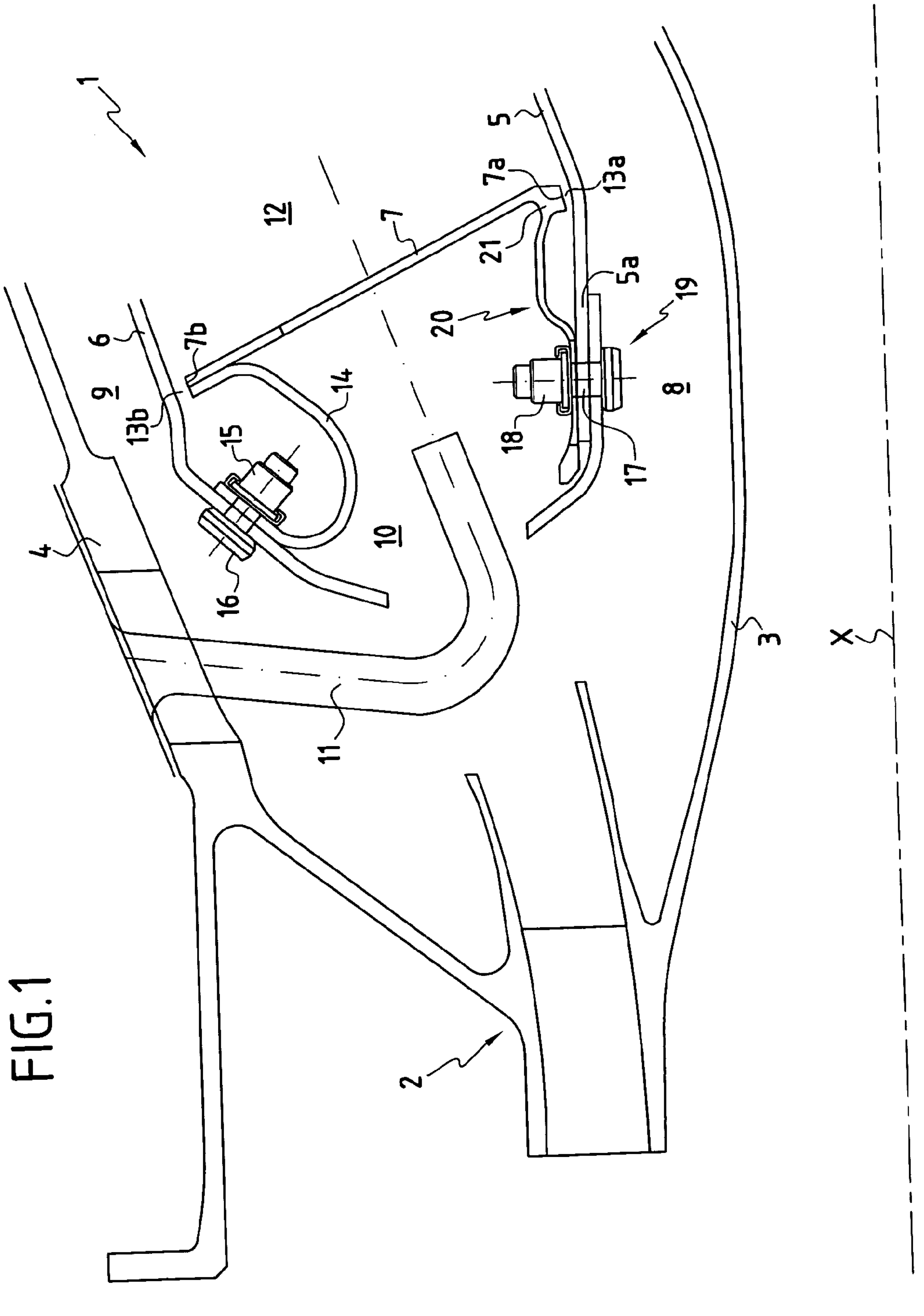
FIG. 1 is a half-view in section of a combustion chamber of a turbomachine of axis X, the section being on a radial plane containing the axis X, the combustion chamber including fittings for attaching the end wall of the chamber in accordance with the invention.

FIG. 1 shows an annular combustion chamber 1 of a turbomachine of axis X disposed downstream from a nozzle 2 between an inside wall 3 of the casing and an outside wall 4 of the casing. In the present description, upstream and downstream are defined relative to the normal flow direction of gas through the combustion chamber 1.

The combustion chamber 1 is defined by a radially-inner side wall 5, a radially-outer side wall 6, and a chamber end wall 7 which extends between the radially-inner side wall 5 and the radially-outer side wall 6 in the upstream region of the chamber 1.

The radially-inner side wall 5 is situated radially outside the inside wall 3 of the casing and co-operates therewith to define an inner annular channel 8 for receiving a flow of air that is used for dilution in the downstream zone of the chamber 1 and for cooling the turbines.

The radially-outer side wall 6 is situated radially inside the outside wall 4 of the casing and likewise co-operates therewith to define an outer annular channel 9 for receiving a flow of air for dilution and for cooling the stators of turbines (not shown in the drawings).

The chamber end wall 7 subdivides the annular volume defined by the radially-inner side wall 5 and the radially-outer side wall 6 into an upstream zone 10 in which fuel pipes 11 are received together with injectors and attachment fittings for the chamber end wall 7, and a downstream zone 12 in which combustion takes place.

As can be seen in FIG. 1, the edges 7*a* and 7*b* of the chamber end wall 7 are spaced apart respectively from the radially-inner and radially-outer side walls 5 and 6 by gaps 13*a* and 13*b* in order to allow for differential radial expansion between the chamber end wall 7 and said side walls 5 and 6.

The outside edge 7*b* of the chamber end wall 7 is fastened to the upstream portion 6*a* of the radially-outer side wall 6 by means of a plurality of flexible attachment fittings 14 which are in the form of arches going round the nuts 15 retaining screws 16 that pass through orifices formed in the upstream portion 6*a* and orifices formed in the ends of the arches 14. This disposition is possible because sufficient space is available in the radially-outer portion of the upstream zone 10.

In contrast, the space available in the radially-inner portion of the upstream zone 10 is not sufficient to enable the radially-inner edge 7*a* of the chamber end wall 7 to be fixed to the upstream portion 5*a* of the radially-inner side wall 5 by means of a plurality of attachment fittings in the form of arches such as those referenced 14 in FIG. 1.

In addition, fixing the radially-inner edge 7*a* to the upstream portion 5*a* of the radially-inner side wall 5 by means of conventional bracket-shaped fittings using screws 17 and nuts 18 cannot be envisaged if the chamber end wall 7 is made of a material having a coefficient of expansion that differs from that of the radially-inner side wall 5, or if the chamber end wall 7 is subjected to temperatures which are higher than those to which the side wall 5 is subjected.

Figure 2:
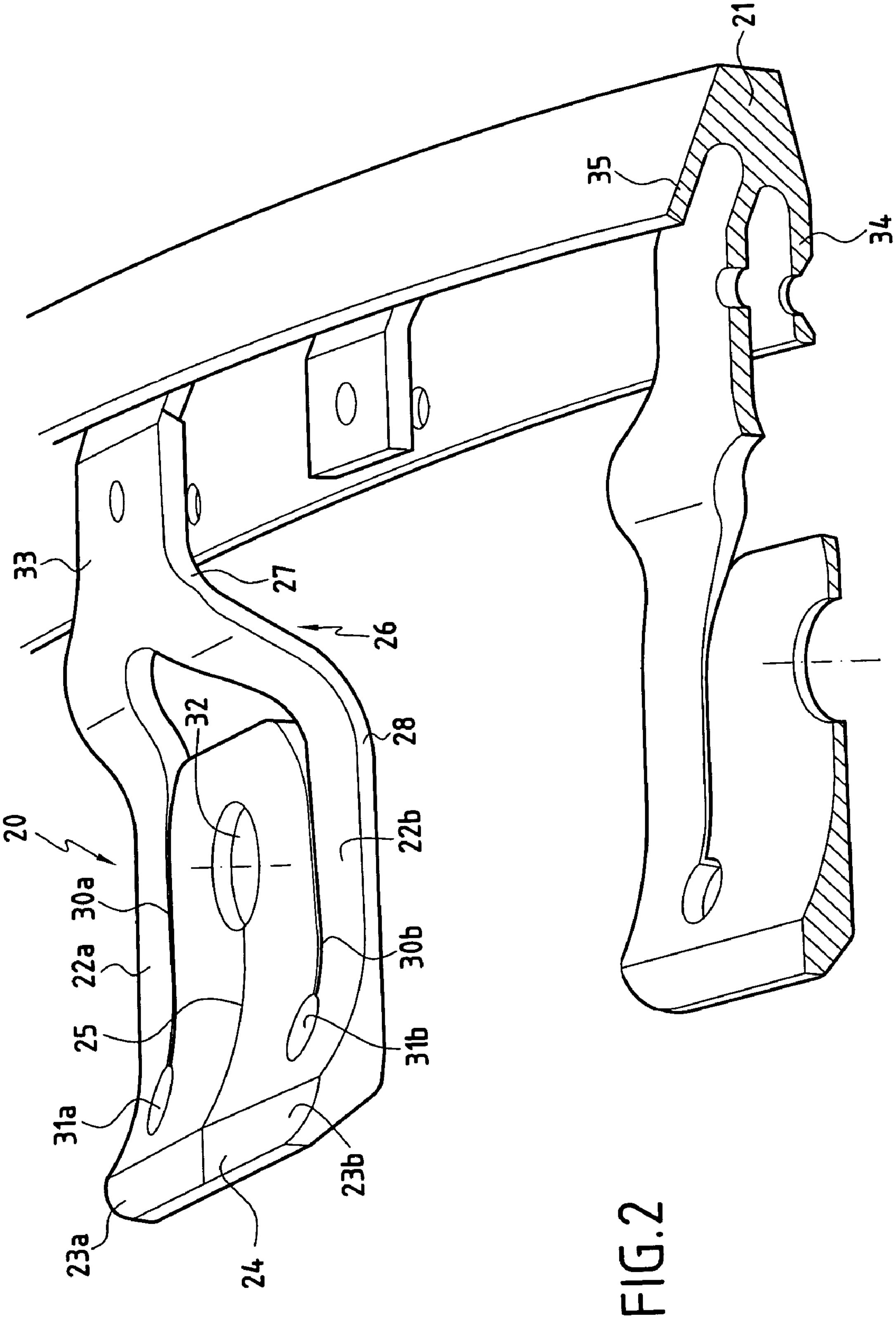
FIG. 2 is a fragmentary perspective view of attachment fittings of the invention.
Figure 3:
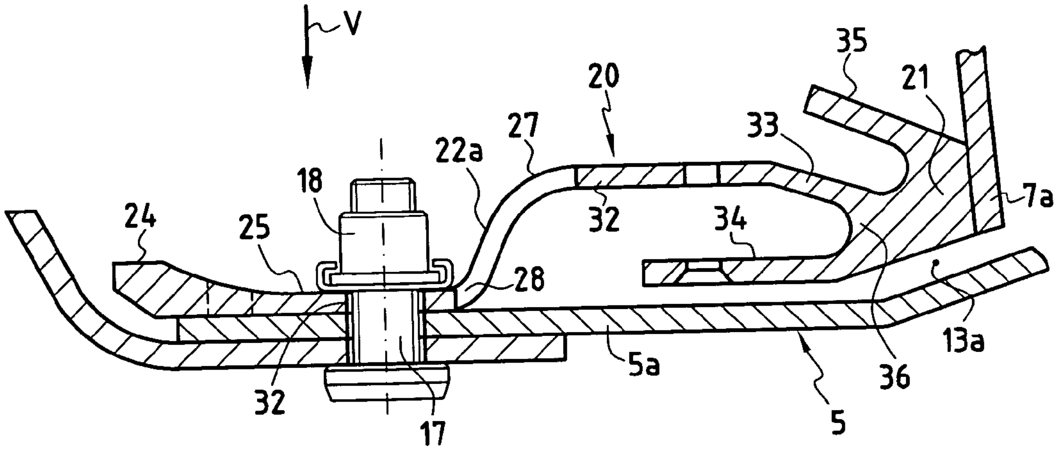
FIG. 3 is a section view on line III—III of FIG. 4 showing an attachment system for attaching a pair of tabs on the radially-inner side wall of the combustion chamber.
Figure 4:
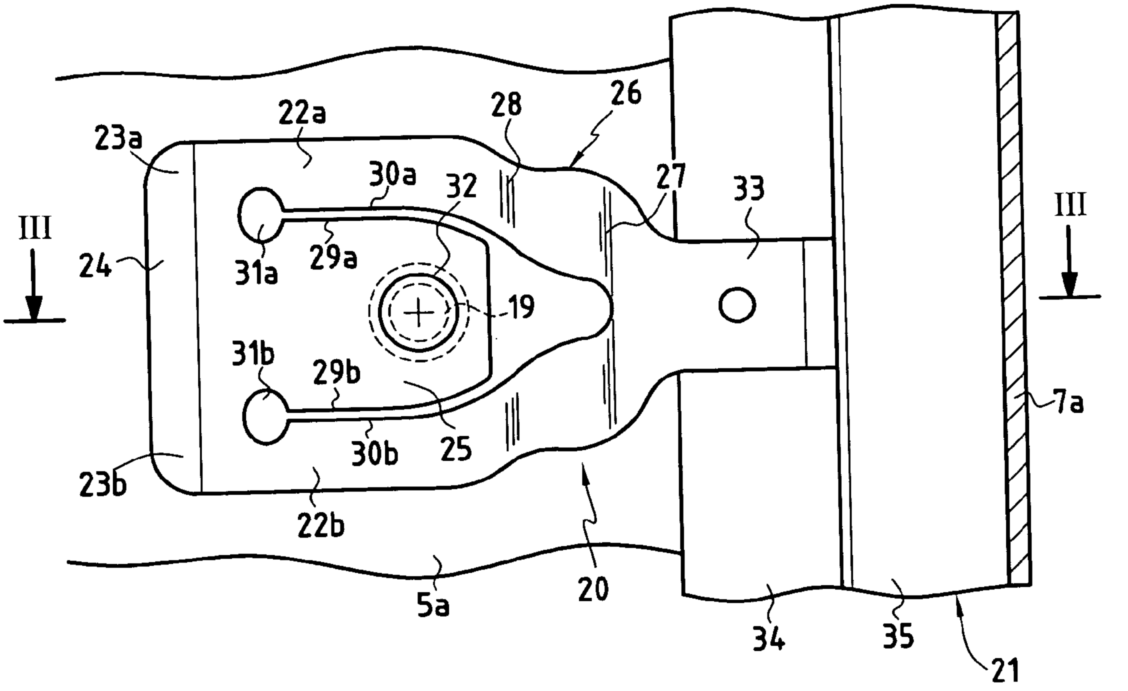
FIG. 4 is a plan view of the FIG. 3 attachment system seen looking along arrow V.

In the invention, and as shown in FIGS. 2 to 4, the attachment fitting 20 radially inside and close to the edge 7*a* of the chamber end wall 7 is integrated in a ring 21 welded to said chamber end wall 7 and comprises a plurality of pairs of tabs 22*a*, 22*b* extending upstream in the radially-inner portion of the upstream zone 10, beyond the zones 19 where the screws 17 and the nuts 18 are bolted together, the two tabs 22*a* and 22*b* in a pair being disposed circumferentially on either side of the bolting zone 19 and being connected at their upstream ends 22*a* and 22*b* to the downstream end 24 of a fixing plate 25 disposed between said two tabs 22*a* and 22*b* and extending substantially in the same plane as the upstream portions of the two tabs 22*a* and 22*b*.

The tabs 22*a* and 22*b* also present an S-shape 26 implemented by two bend zones 27 and 28 bending in opposite directions, the radially-inner bend zone 28 being situated slightly downstream from the bolting zone 19 and bearing against the radially-outer face of the radially-inner side wall 5.

The tabs 22*a* and 22*b* are separated from the edges 29*a* and 29*b* of the fixing plate 25 by slots 30*a* and 30*b* which open out into holes 31*a* and 31*b* situated in the vicinity of the ends 23*a* and 23*b* of the tabs 22*a* and 22*b* and the upstream end 24 of the fixing plate 25.

The holes 31*a* and 31*b* are of a diameter that is sufficient to limit stresses in these zones. In addition, the ends 23*a* and 23*b* of the tabs 22*a* and 22*b*, and the upstream end 24 of the fixing plate 25 present considerable extra thickness in order to limit any risk of the connections between the tabs 22*a* and 22*b* and the fixing plate 25 breaking. The fixing plate 25 naturally includes a through bore 32 for passing a fixing screw 17.

The two tabs 22*a* and 22*b* connect together downstream from the radially-outer bend zone 27 so as to form a branch 33 that is substantially parallel to the upstream portion 5*a* of the radially-inner side wall 5.

On either side of the branches 33, the ring 21 presents firstly a radially-inner lip 34 spaced apart from the radially-inner side wall 5 by a distance equal to the thickness of the gap 13*a*, and secondly a radially-outer lip 35.

In the absence of any radial expansion difference between the anchor point 36 of the branch 33 on the ring 21 and the radially-inner side wall, the portions of the tabs 22*a* and 22*b* situated upstream from the bend zone 28 press against the outside face of the radially-inner side wall 5. The same applies for the fixing plate 5. This rest position or position in which there is no stress in the attachment fitting 20 is shown in dashed lines in FIGS. 5 and 6.

Figure 5:
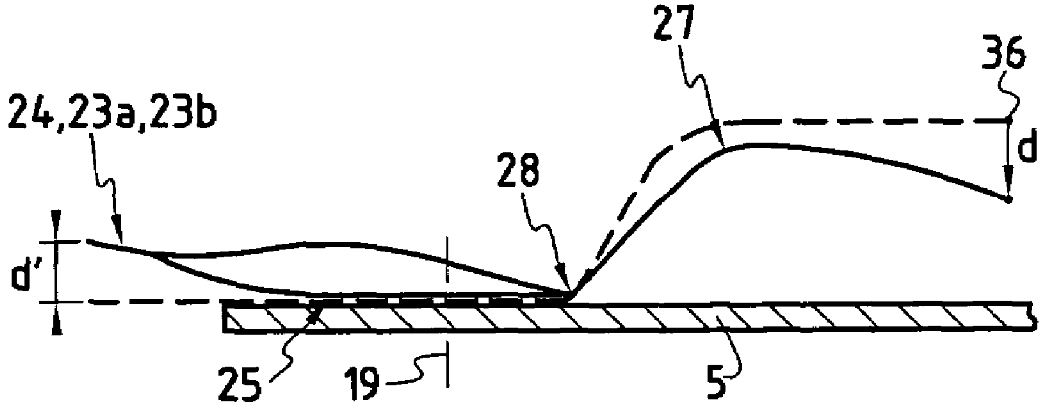
FIGS. 5 and 6 are similar to FIG. 3 and show the deformation to which the tabs and the fixing plate are subjected respectively in the event of radial shrinkage or radial expansion of the attachment points of the tabs on the end wall of the chamber relative to the radially-inner side wall of the combustion chamber.

If the inner side wall 5 has a coefficient of expansion that is greater than that of the chamber end wall 7, as is shown in FIG. 5, then the anchor point 36 moves towards the inner side wall 5 through a distance d in the event of a rise in temperature, and the upstream portions of the tabs 22*a* and 22*b* pivot about the bend zone 28 bearing against the inner side wall 5, while the ends 23*a*, 23*b* of the tabs 22*a*, 22*b*, together with the end 24 of the fixing plate move away form the inner side wall through a distance d'. The downstream portions of the tabs 22*a* and 22*b* naturally move closer to the radially-inner side wall. This disposition serves to limit deformation of the tabs 22*a* and 22*b* and the extent to which the chamber end wall 7 can move relative to the inner side wall 5 in the event of vibratory resonance.

Figure 6:
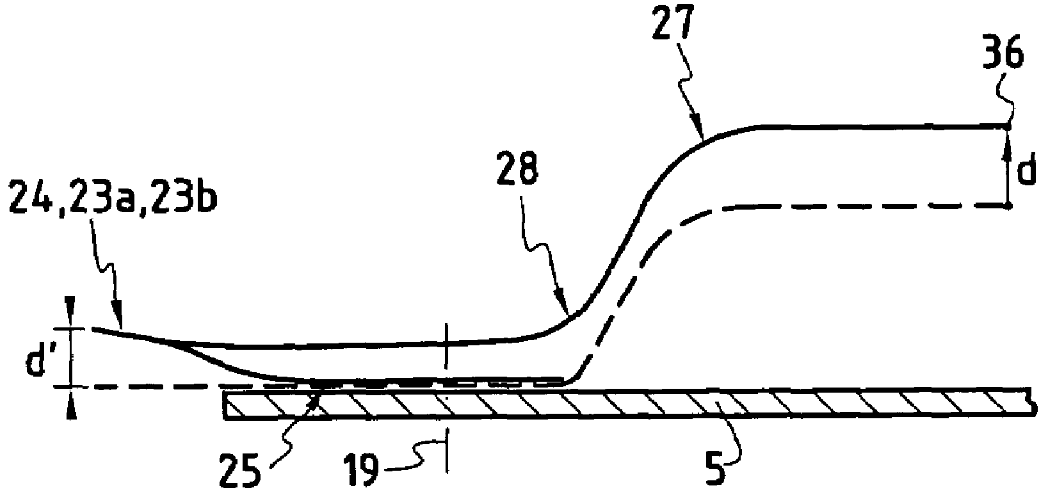

If, on the contrary, the chamber end wall 7 has a coefficient of expansion greater than that of the radially-inner side wall 5, the anchor point 36 of the branch 33 moves away from the inner side wall 5 through a distance d in the event of temperature rising, as is shown in FIG. 6. The set of tabs 22*a* and 22*b* moves away from the inner side wall 5 and the fixing plate 25 takes up a configuration similar to that shown in FIG. 6.

In both of the configurations shown in FIGS. 5 and 6, the connections between the ends 23*a* and 23*b* of the tabs 22*a* and 22*b* and the end 24 of the fixing plate 5 situated upstream from the holes 31*a* and 31*b* are subjected to radial bending forces, thereby leading to high levels of stress in the extra thickens at said ends.

The person skilled in the art will understand that the above-described attachment fitting 10 can also be used for fixing the radially-outer edge 7*a* of the chamber end wall 7 to the radially-outer side wall 6, instead of using the arches 14.

What is claimed is:

1. An annular combustion chamber for a turbomachine of axis X, the chamber comprising a radially-inner side wall, a radially-outer side wall, and a chamber end wall disposed between said inner and outer side walls in the upstream region of said chamber, said chamber end wall being fixed to said inner and outer side walls by means of a plurality of radially-inner attachment fittings and by means of a plurality of radially-outer attachment fittings disposed upstream from said chamber end wall by bolting a zone of each of said fittings to said side walls, wherein at least one of said pluralities of attachment fittings is integrated in a ring secured to the chamber end wall and comprises a plurality of pairs of tabs which extend upstream beyond the bolting zones, the two tabs in each pair being disposed circumferentially on either side of a bolting zone and being interconnected at their upstream end to the upstream end of a fixing plate which extends between said two tabs and which presents a bolting zone for being fixed to the adjacent side wall.

2. A combustion chamber according to claim 1, wherein the upstream ends of the tabs in a pair of tabs, and the upstream end of the associated fixing plate include portions of extra thickness for withstanding radial bending stresses.

3. A combustion chamber according to claim 2, wherein each tab is separated from the associated fixing plate by a slot opening out into a hole situated in the vicinity of the portion of extra thickness.

4. A combustion chamber according to claim 1, wherein the tabs are S-shaped between the ring and the bolting zone.

5. A combustion chamber according to claim 4, wherein the tabs are suitable for bearing against the adjacent side wall at least in the vicinity of the S-shape in order to limit the extent to which the chamber end wall can move relative to said side wall in the event of vibratory resonance.

6. A combustion chamber according to claim 1, wherein the ring is secured to the chamber end wall by welding.

7. A combustion chamber according to claim 6, wherein the ring is welded to the radially-inner edge of the chamber end wall and is separate from the radially-inner side wall by a gap serving to compensate for radial expansion differences between the chamber end wall and said side wall.

* * * * *